T. CARNEY, DEC'D.
O. F. DAVISSON, ADMINISTRATOR.
CASH REGISTER.
APPLICATION FILED FEB. 28, 1907.
1,016,066.
Patented Jan. 30, 1912.
6 SHEETS—SHEET 2.
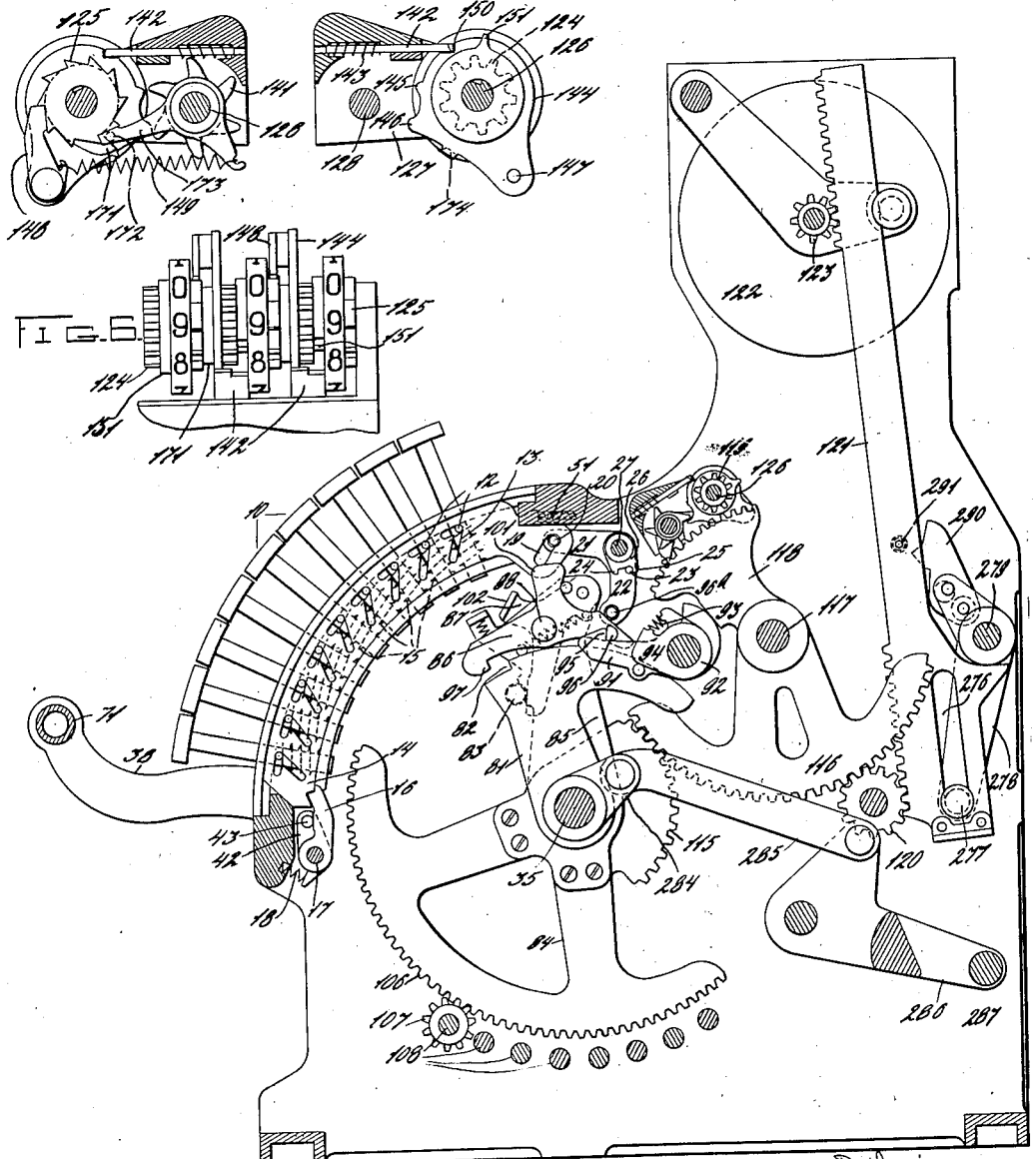

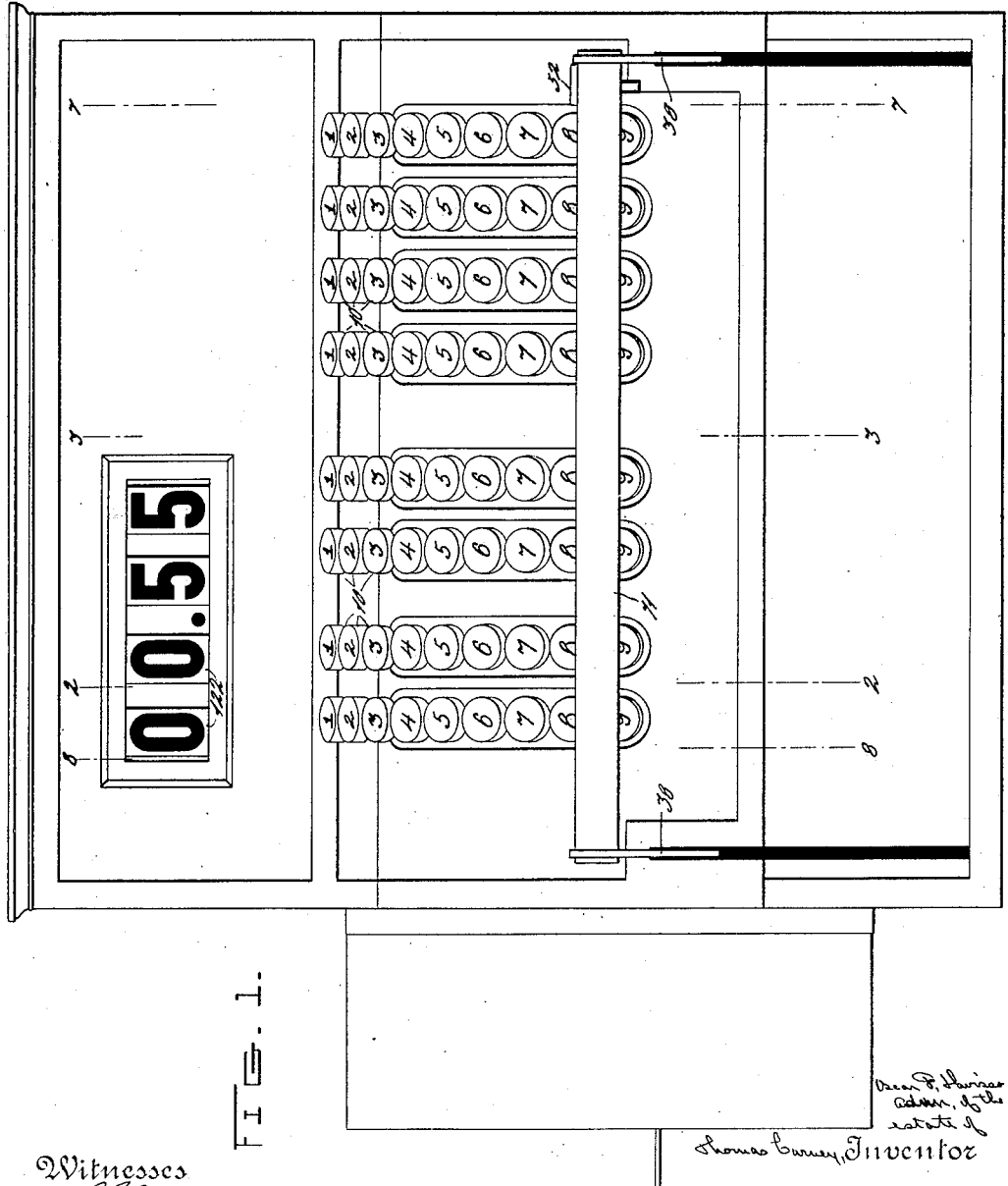

T. CARNEY, DEC'D.
O. F. DAVISSON, ADMINISTRATOR.
CASH REGISTER.
APPLICATION FILED FEB. 28, 1907.
1,016,066.
Patented Jan. 30, 1912.
6 SHEETS—SHEET 3.
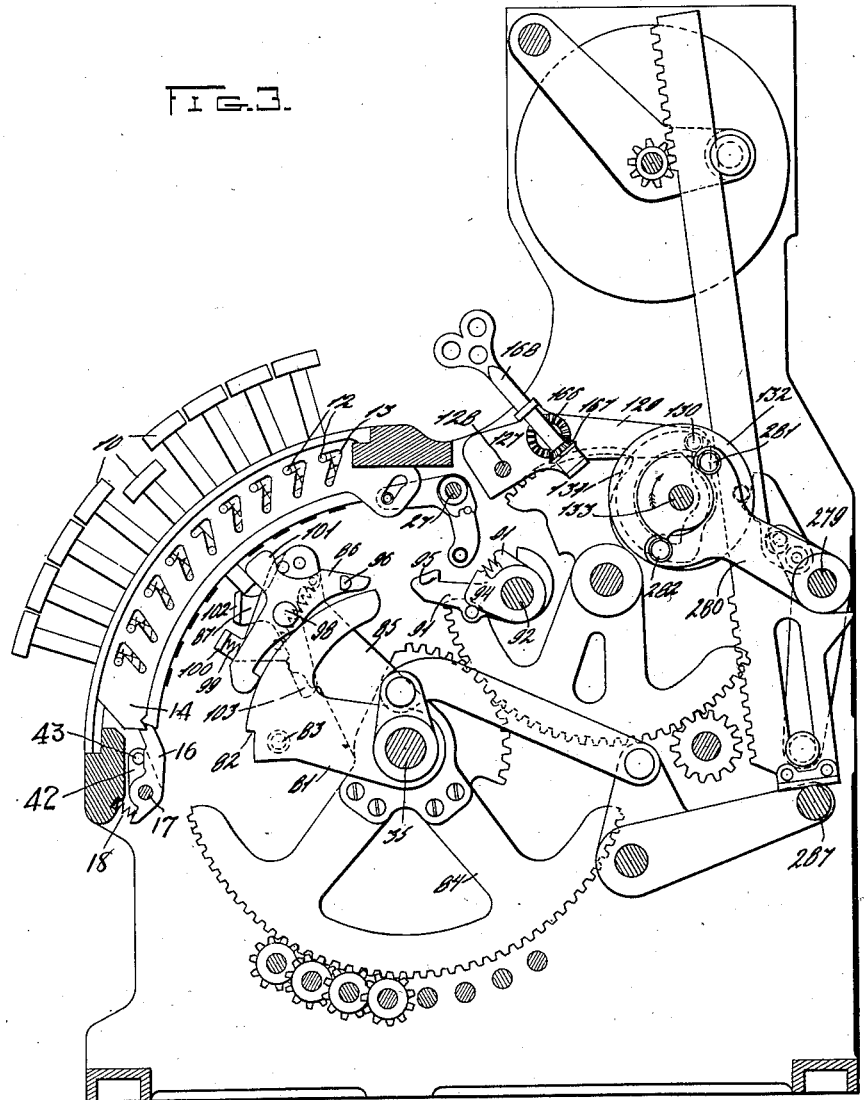

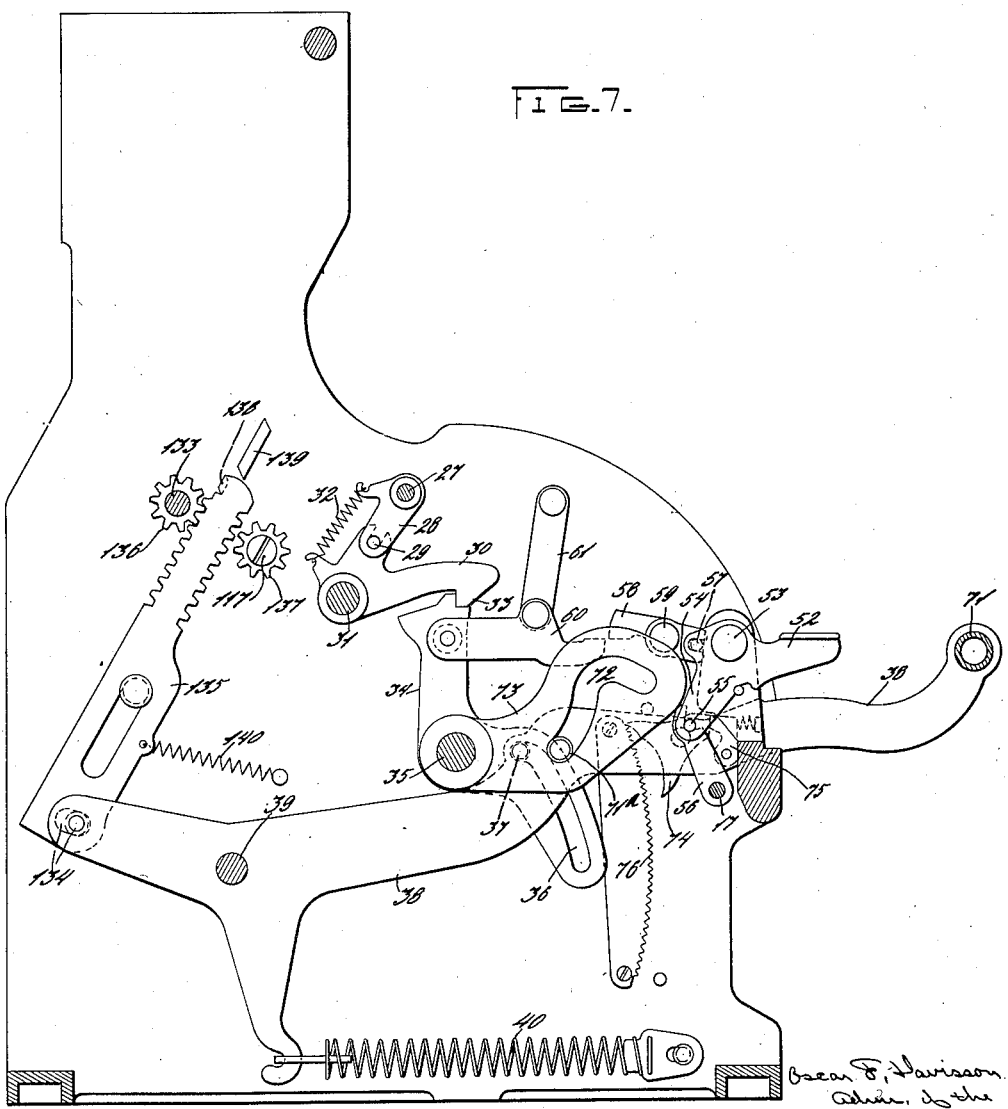

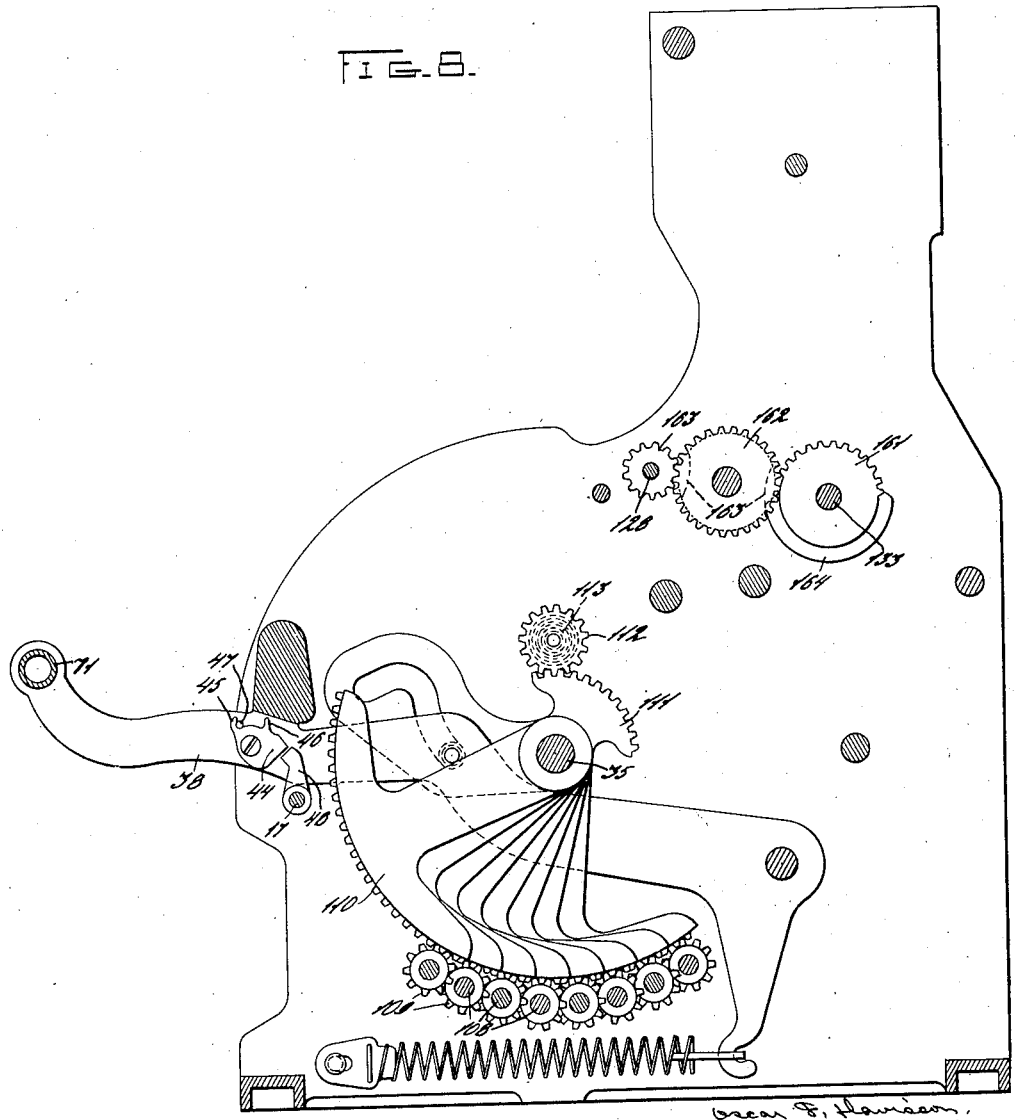

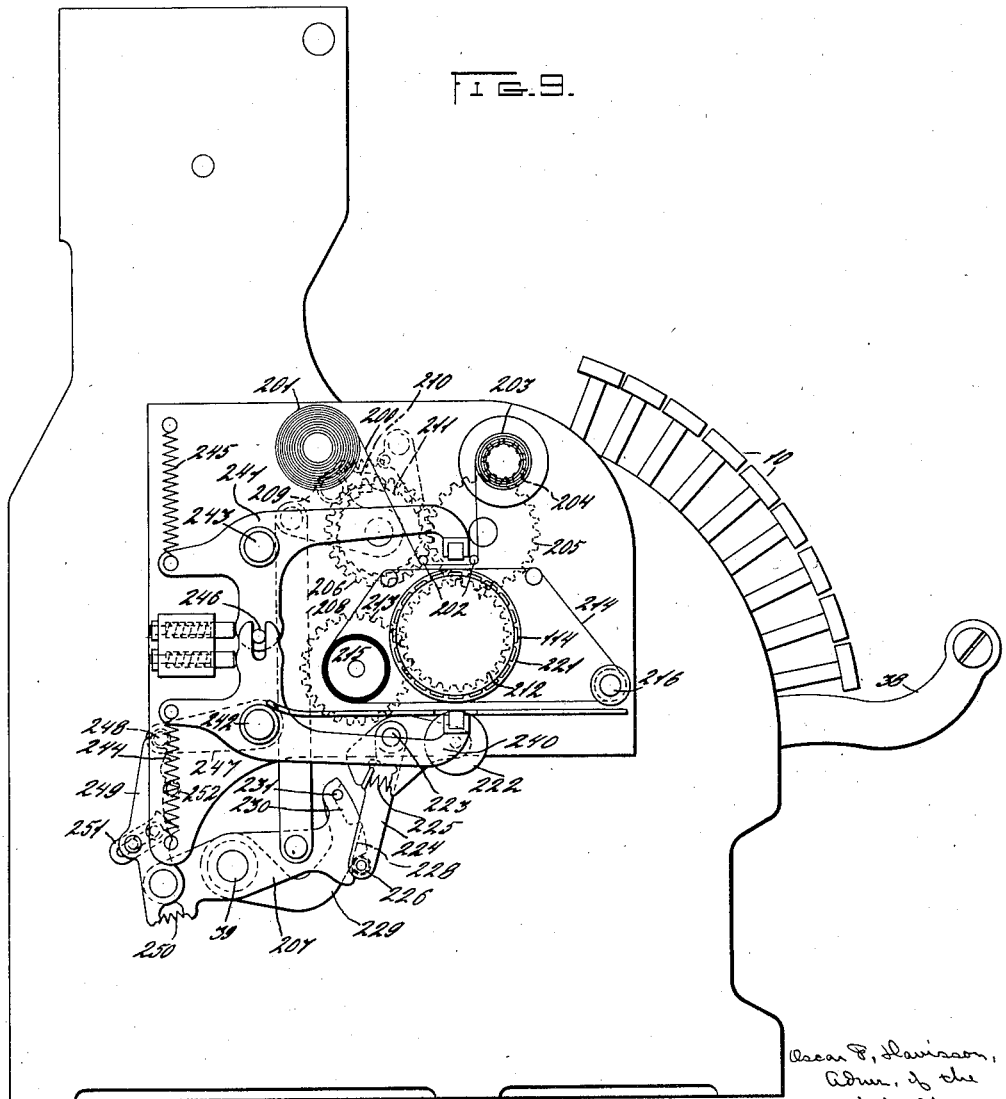

UNITED STATES PATENT OFFICE.

OSCAR F. DAVISSON, OF DAYTON, OHIO, ADMINISTRATOR OF THOMAS CARNEY, DECEASED.

CASH-REGISTER.

1,016,066.  Specification of Letters Patent.  Patented Jan. 30, 1912.

Application filed February 28, 1907. Serial No. 359,948.

*To all whom it may concern:*

Be it known that I, OSCAR F. DAVISSON, a citizen of the United States, residing at Dayton, county of Montgomery, in the State of Ohio, administrator (with will annexed) of the estate of THOMAS CARNEY, late a citizen of the United States, deceased, who did in his lifetime invent certain new and useful Improvements in Cash-Registers, do declare the following to be a full, clear, and exact description of said invention.

This invention relates to cash registers and has for its main object to provide a so called two department machine to register simultaneously two different classes of transactions.

The machine is also adapted, and this is a second general object, to use as a cost and selling price machine wherein two registers are provided on one of which the cost prices of goods sold are entered and on the other of which the selling prices of goods sold are also registered.

Among the objects of the invention may be noted the provision of improved mechanism for preventing the overthrow of the register and of the indicators by the provision of positive actuating means for the same. An improved zero setting device is provided with means for preventing the tripping of the transfer pawls when a counter is so reset.

The machine is adapted to use an inserted receipt or slip and mechanism is provided for feeding this slip slightly so that additional purchases may be accounted for thereon.

A further improvement consists in the provision of means for printing the amounts of the two departments in distinctive colors.

With these and incidental objects in view the invention consists of certain novel features of construction and combination of parts the essential elements of which are set forth in appended claims and a preferred form of embodiment of which is hereinafter described with reference to the drawings which accompany and form part of this specification.
Of said drawings: Figure 1 is a front elevation of the machine showing the cabinet in position. Fig. 2 is a transverse vertical section through the machine on line 2—2 of Fig. 1 showing the parts in normal position. Fig. 3 is a section on line 3—3 of Fig. 1 showing the parts in adjusted position. Figs. 4, 5 and 6 are detail views of the computing or registering mechanism, Figs. 4 and 5 being transverse sections and Fig. 6 a plan thereof. Fig. 7 is a section on line 7—7 of Fig. 1 showing the main operating device of the machine. Fig. 8 is a section on line 8—8 of Fig. 1 showing the connections to the printing mechanism. Fig. 9 is an elevation of the printing mechanism and the left hand end of the machine.

As above stated the machine of the present invention is a two department machine and is intended particularly to be used as a so called cost and selling price machine. Mechanisms of this type are now in use and are intended to furnish a summation of both the cost and selling price of articles sold in commercial establishments. Two registers are provided and separate banks of keys controlling each register and it is intended that on one register the selling prices shall be added and on the other register the cost prices shall be added.

This present machine is a so called two motion machine in which the keys act merely as stops for differential elements, the power to move the elements as well as the indicating and printing devices being furnished by an operating handle or crank lever. In the present machine differential elements are normally locked in zero position and are released by depression of a key which also releases the main operating element. The differential elements are positively stopped by the keys and then finally returned and relocked by the operating mechanism. The printing devices are at all times connected to the differential elements so that they are set at each operation remaining set only long enough to take an impression therefrom and are then returned to zero position.

The means for producing differential motion in the machine are shown in Figs. 2 and 3, Fig. 2 showing the elements in normal position and Fig. 3 showing them after a partial operation of the machine. As shown in Fig. 1 eight banks of keys are provided each numbered from one to nine inclusive and each controlling a train of differential elements. It will be understood that all the trains are precisely similar so that a description of one will be sufficient. The banks of keys 10 are carried in segmental frames and each key is provided with a pin 12 moving in a bayonet slot 13 of a segmental sliding detent 14. When any key is depressed against the resistance of its returning spring 15 its pin 12 rides down a cam part of the bayonet slot 13 thereby raising the detent 14 when the pins 12 of the remaining keys in the bank pass into the circular portion of the slot 13 and are thereby locked against depression. When the detent reaches its upper position it is locked therein by one of a series of detent pawls 16 loosely mounted on a shaft 17 and each provided with a spring 18 tending to force the pawl to locking position. The upper end of the detent is provided with a cam slot 19 in which rides an antifriction roller 20 on a bell crank lever loosely mounted on a shaft 27 and comprising arms 21 and 22. It will be understood that one such lever is provided for each bank of keys. Each bell crank lever has mounted thereon a pin 23 moving between spaced projections 24 and 25 of arms 26 rigidly mounted on shaft 27. It will be seen that when any detent 14 is raised the corresponding bell crank will be rocked around shaft 27 and through the pin 23 will carry the shaft with it but such movement will not move any of the other bell crank levers inasmuch as projections 24 and 25 are spaced apart to prevent such movement. On the right hand end of shaft 27 (as shown in Fig. 7) is an arm 28 having a pin and slot connection 29 with a locking lever 30 journaled on a pin 31 in the machine frame. A spring 32 tends normally to rock the lever 30 to a position such that its latching projection 33 is in front of a bell crank lever 34 journaled loosely on the main supporting shaft 35. This bell crank lever 34 is provided in its forward arm with a slot 36 in which rides an antifriction roller 37 mounted on one of the two main operating levers 38. These levers are mounted rigidly on shaft 39 and are returned to normal position by strong coiled springs 40. It will be clear that projection 33 of pawl 30 normally locks the bell crank lever and thereby prevents movement of the main operating handle as such movement requires the traverse of roller 37 through the cam slot 36. When however a key is depressed the shaft 27 is rocked as before stated and this raises latching lever 30 enough to carry its projection 33 away from in front of lever 34 and the handle may then be operated. At the end of the operation it is necessary to release the keys and this is provided for by the release of locking detents 16. These detents as stated are loose on shaft 17 and rigid with said shaft are frame arms 42 connected by the rod 43 (see Fig. 2) lying in front of all the said detents 16. One of the operating levers 38 as shown in Fig. 8 has a gravity pawl 44 having spaced projections 45 and 46 on opposite sides of a pin 47 carried by the main lever. The rear projection of pawl 44 is adapted to engage and rock the arm 48 rigidly mounted on shaft 17. In Fig. 8 the parts are in normal position and it will be seen that the depression of operating lever 38 will rock pawl 44 around its pivot moving projection 46 up toward the pin 47 and allowing the pawl to pass the arm 48 without moving the same. When however the handle lever 38 approaches its upper position again the rearward projection of pawl 44 will strike the arm 48 and at this time the projection 45 will lock against pin 47 forcing the arm 48 rearwardly and thereby rocking the shaft 17 and the rod 43 moved therewith to release the detent pawls 16, when the detents are returned to their normal lower position by springs 51 shown in dotted lines in Fig. 2. It may at times be desired to release the keys without an operation of the machine, as for example if a key is depressed by error and with this object a release key 52 is provided (shown on Fig. 7) pivoted on a pin 53 and having a downward extension 54 carrying a pin 55. This pin is normally in front of an arm 56 also rigidly mounted on shaft 17 and when release key 52 is depressed it will move the pin 55 rearwardly thereby rocking shaft 17 and releasing the detents 16 as was stated to be the case when the handle approached its normal upward position. For the double purpose of locking the machine during the depression of the release key and for locking the release key after the machine starts to operate, the said key is provided with a pin 57 adapted to rock an arm 58 around its pivot on pin 59, depressing the rearward end of the same in front of a link 60 connected to the locking bell crank lever 34. The link 60 is also supported by a superjacent link 61 pivoted to the main frame. When the release key is depressed the arm 58 is rocked in front of the link 60 thereby preventing the operation of the handle levers 38. As soon as the handle starts the link 60 is moved forwardly passing under the arm 58 so that depression of the release key is thereby prevented.

Passing now to the differential elements reference may be made to Figs. 2, 3 and 7. The handle levers 38 are connected at their forward ends by a handle bar 71 so that they move together at all times. An antifriction roller 71ª carried by each of the levers rides in a curved slot 72 in operating lever 73 mounted rigidly on shaft 35. It will be seen from the shape of slots 72 that during the first part of the movement of levers 38 the operating levers 73 will be rapidly depressed but will cease movement some time before the handle levers 38 reach their lower position. This construction serves to prevent overthrow of the accounting elements. To compel a complete operation of the handle levers 38 one of them is provided with a double full stroke pawl 74 of usual construction, a latch 75 serving to retain it in either position as it moves downwardly and upwardly over a rack 76. This construction is well known in the art. Mounted rigidly on shaft 35 are a series of operating segments 81 one for each bank of keys. The segments are each provided with a notch 82 for connecting them to the differential elements and with an antifriction roller 83 serving to return the said elements to normal position. Loosely mounted on the shaft 35 are a series of rack segments 84 one for each bank of keys each provided with a vertically extending arm 85 carrying a main actuating latch 86 and an auxiliary latch 87. The segments 84 are normally locked in zero position by the provision of a series of latches 91 loosely mounted on a rod 92 and pressed by springs 93 between them and a series of collars 94 rigid on said rod so that the forwardly projecting ends of the pawls 91 as indicated at 95 are in front of lugs 96 carried by the connecting latches 86. The downwardly extending arms 22 of the bell cranks are each provided with an antifriction roller 96ᵃ normally engaging as shown in Fig. 2 with a rearward cam edge of connecting latches 86 thereby holding their forward projecting ends 97 above the periphery of the segments 81. When a key is depressed in any bank its roller 96ᵃ is moved away from the cam edge of the connecting latch 86 when the latch immediately rocks around its pivot 98 under tension of a spring 99 between the latch and a flange 100 of the extension 85 bringing the projection 97 in front of notch 82 of the segment 18 so that movement of the said segment will produce an equal movement of the connecting latch and its segment 84. The connecting latches are each provided with an upwardly extending part 101 whose path intersects that of the amount keys so that a depressed key will be struck by the projection 101 and will rock the connecting latch 86 around its pivot 98 thereby disconnecting the same from the operating segment 81. By this means a differential mechanism is produced and a positive stop device for the segment 84 is provided. To prevent rebound of the differential mechanism the auxiliary latch 87 is provided having a flange 102 adapted to strike and pass under the depressed key and then to rise again through a spring or its own gravity. This serves to latch the mechanism until the segments 81 return to normal position when the rollers 83 first strike the depending ends 103 of the auxiliary latches 87 rocking the flanges 102 below the keys and in their further movement striking the edge of arms 85 and returning them together with the connecting latches and other mechanism carried thereby to normal position. As the connecting latches reach normal position the lugs 96 thereon strike cam edges of the latches 95 depressing them against the resistance of their springs 93 and finally passing to the rear of the said projection when the latches 95 immediately rise and again lock the differential elements in normal position. The final increment of return movement of the connecting latches 86 brings their cam edges against the antifriction rollers 96ᵃ and again elevates the forward ends 97 above the notches 82 of the operating segments 81. It will be seen that the differential elements are locked between operations in zero position, are positively moved to the desired position of differential adjustment, are positively held in such position by the depressed keys, and are then quickly returned also positively to normal position and there locked.

The segments 84 are provided with gear teeth 106 meshing each with a pinion 107 on a shaft 108 there being as shown in Fig. 2 eight of said pinions 107 and a corresponding number of shafts 108. On the other ends of the shafts 108 as shown in Fig. 8 are other pinions 109 gearing with rack segments 110 which are journaled loosely on shaft 35 and are each provided with an upwardly extending segment 111 gearing with pinions 112 on a series of nested sleeves 113. The outer ends of the sleeves 113 are provided with printing wheels 114 as shown in Fig 9. The segments 84 are also provided with auxiliary segments 115 gearing with segments 116 loose on shaft 117 provided with upwardly extending segments 118 which are actuating segments for the totalizer 119. Gearing with segments 116 are pinions 120 which mesh with vertical rack bars 121 serving to move the indicators 122 through pinions 123.

The indicators 122 are held in their set positions by any suitable alining device (not shown).

Totalizing, indicating and printing mechanism may next be described in the order mentioned. The totalizer 119 comprises a series of wheels having numbers on their periphery and having gear pinions 124 and ratchet pinions 125 as is usual in devices of this type. The wheels are all supported on a totalizer shaft 126 carried by frame arms 127 pivoted on a shaft 128 and one of which frame arms as shown in Fig. 3 is provided with a rearwardly extending arm 129 carrying at its upper end an antifriction roller 130 moving in a cam groove 131 of a cam disk 132 on shaft 133. This shaft is given a complete rotation at each operation of the machine by mechanism old in the art and shown in Fig. 7. Connected to the rear end 13t of one of the handle levers 38 by a pin and slot connection 134 is a vertical rack bar 135 having rack teeth on both sides as shown, adapted to gear successively with pinions 136 on shaft 133 and 137 on shaft 117. A flange 138 on the rack bar 135 passes up on the rear side and down on the forward side of the flange 139 being thrown in opposite directions at the opposite ends of its travel by a spring 140. A gear not shown constantly connects the pinions 136 and 137 the whole mechanism providing for giving a complete rotation to shaft 133 at each operation of the machine. It will be seen from the shape of the cam groove 131 that the totalizer wheels will be slightly depressed into gear with the vertical segments 118 and then raised at the end of the operation, thus providing as is usual for movement in one direction only of the counter wheels. The supporting shaft 128 for the totalizer supporting frame is a transfer shaft for the machine. As shown in Figs. 2 and 4 this shaft is provided with a series of helically arranged cams 141 for operating the transfers successively. Trip plungers 142 are provided one for each totalizer wheel normally pressed rearward by coiled springs 143. Beside each totalizer wheel is a disk 144 having two projections 145 and 146 and also having pivoted thereto at 147 a transfer pawl 148 which is normally drawn by a spring 149 into contact with the ratchet teeth 125. The disk 144 has a cut away portion 150 in which the plunger 142 normally extends thereby preventing movement of the disk and the transfer pawl. Each wheel except the one of highest order has a trip cam 151 moving therewith which when the wheel passes from nine to zero strikes the rearward end of the trip plunger 142 for the next higher order and moves the same forwardly enough to carry the end of said plunger away from the cut away portion 150 of the disk 144. The disk then immediately swings in clockwise direction (see Fig. 5) around its pivot on shaft 126 until projection 145 strikes the trip plunger thereby bringing the other projection 146 into the path of one of the helical cams 141. The swinging of the disk 144, as above explained, is caused by the spring 149 (see Fig. 4). At each operation of the machine a complete rotation is given to the transfer shaft 128 by the train of gearing shown on Fig. 8. On shaft 133 is a mutilated gear 161 serving to give a half rotation to the gear 162 which meshes with a pinion 163 of half its size rigidly mounted on transfer shaft 128. The gear 162 is provided at opposite extremities of a diameter with a cut away portion 163 serving to lock with a flange 164 carried by the gear 161. This mechanism evidently serves to lock the gear 162 while gear 161 makes half its rotation and to allow movement of gear 162 during the other half rotation of shaft 133 and gear 161 resulting therefore in a complete rotation of shaft 128 to turn in the transfers. This returns the disk 144 to such position that the notch 150 is again engaged by the plunger 142. To reset the totalizer elements the shaft 126 is provided with a notch and each wheel has a pawl adapted to pass into the said notch when the shaft is rotated through a pinion 166 (see Fig. 3) on the end thereof gearing with a beveled pinion 167 operated from a key 168. When the key is turned the register shaft 126 is given a complete rotation picking up the numeral wheels and carrying them forward until the zero position is reached. At this operation it is necessary to prevent the tripping of the transfer pawls as otherwise mis-operation of the machine would result and to this end fastened to the shaft 126 adjacent to each numeral wheel is a cam flange 171 adapted to engage a pin 172 projecting from a detent pawl 173 loosely mounted on shaft 128. The disk 144 carrying the transfer pawls is provided with a transverse lug 174 and when the flange 171 reaches nearly the home position it abuts and lowers the detent pin 172 carrying the pawl 173 into the path of lug 174 thereby preventing the retractive movement of the transfer pawls. When the register wheels reach complete zero position the cams 171 fast to the shaft 126 pass beyond pins 172 and the detents 173 may immediately move to their usual holding position.

It has been stated that on the outer ends of the nested sleeves 113 are the printing wheels 114 there being eight wheels in the present machine. The machine is adapted to print on a detail strip and on an inserted slip and means are provided for feeding both the strip and slip at each operation. The detail strip 200 is stored on a roller 201 passing under and around supporting pins 202 and being wound on a roller 203. To provide a feed of the detail strip the roller 203 is rigidly fastened to a pinion 204 connected through gear 205 with an operating gear 206. It will be remembered that the handle levers 38 are fast on shaft 39 and this shaft also carries an arm 207 rigid therewith and connected to it through a link 208 is a pawl carrying arm 209 on which is mounted a spring pressed driving pawl 210 acting on a ratchet 211 rigid with driving gear 206. At each operation of the machine shaft 39 is rocked slightly and the mechanism described clearly serves to advance the gear 206 and through it the feeding roller 203 at each operation. The gear 205 meshes with a gear 212 which itself drives a gear 213 for feeding the inking ribbon 214 which passes over a roller 215 driven with said gear. The ribbon is also supported by a roller 216 as well as additional pins. It will be seen that the inking ribbon 214 passes completely around the printing wheels so that an impression may be taken both at the top and at the bottom thereof, it being understood that the printing wheels as usual in this art are provided with two sets of type from zero to nine inclusive.

The inserted slip is placed on a table at the side of the mechanism shown in Fig. 1 and thereby brought under the printing wheels 114. It may be desired at times to print a number of amounts on the sales slip and for this purpose mechanism is provided for slightly feeding the slip after each operation. Connected to the gear 212 is a large friction feeding roller 221 and an additional roller 222 is adapted to be raised into contact with the same during part of each operation. This roller 222 is mounted in a frame on a pin 223 and between this frame and an arm 224 is a compression spring 225. The arm 224 at its lower end has an anti friction roller 226 adapted to be moved forwardly when the shaft 39 is rocked by cam edge 228 of arm 207. A second arm 229 is loosely mounted on the shaft 39 beside the arm 207 and has a cut away portion 230 in which moves the pin 231 on said arm 207. The arm 229 is also cut away to pass around the friction roller 226 and as arm 207 moves downwardly with the handle lever the cam edge 228 thereof will gradually force roller 226 forwardly thereby moving the friction roller 222 up against the roller 221. When the roller 226 is thus forced forwardly it passes out of its appropriate cut away portion of arm 229 and said arm is then free to drop down to maintain said roller in forward position. The provision of the arm 229 is merely to maintain the two friction feeding rollers in contact somewhat longer than would be the case if only arm 207 was provided as it would be impossible to provide a cam edge of arm 207 sharp enough to force a roller 226 rearward at the proper time. The roller 226 needs to be maintained in its forward position during practically the whole upward stroke of arm 207 but should not be moved forward until nearly the complete downward stroke of arm 207 has taken place inasmuch at this time the slip is being printed and if rollers 221 and 222 were brought together a feed of the slip would result possibly causing a blurred impression to be taken.

To cause an impression on the slip and strip two platen arms 240 and 241 are provided pivoted at 242 and 243 and drawn to striking position by springs 244 and 245. The platens are connected by a pin and slot 246 and are moved away from the printing type to tension the driving springs through an arm 247 connected to the slip printing platen. This arm bears at its rearward end an anti friction roller 248 under which is a vertical arm 249 having a cut away portion at the top for fitting around the roller 248 and fastened to a rearward extension of arm 207. A spring 250 between the arm 249 and the arm 207 serves to throw the upper end of arm 249 forwardly. When the handle levers are depressed the shaft 39 is rocked and arm 249 carried upwardly thereby withdrawing the platen arms from the printing type and tensioning the driving springs, and this movement continues until an adjustable piece 251 on arm 249 strikes a stationary pin 252 when the arm 249 is rocked rearwardly enough to release the same from roller 248 the springs 244 and 245 immediately thereafter driving the platens against the strip and the slip. As the handle levers return to normal position both the strip and slip are fed by the mechanism previously described.

The indicator rack bars 121 are provided at their lower ends with long slots 276 riding on anti friction rollers 277 supported in arms 278 which are suspended from a rod 279. At one end of this rod 279 and also rigid therewith is an arm 280 bifurcated at its forward end to surround a cam on shaft 133 the arm 280 being provided with anti friction rollers 281 and 282 directly abutting the cam. Rigidly mounted on shaft 35 is an arm 284 (Figs. 2 and 3) and connected with this through a link 285 is a frame comprising arms 286 and a connecting rod 287. The parts are shown in Fig. 2 in normal position and it will be seen from this figure and from Fig. 3 showing the parts in operated position that the arm 280 is rocked downwardly thereby throwing the arms 278 rearwardly and moving the rack bars 121 away from their driving pinions 120. As the handle bars 38 descend the shaft 35 is rocked and the frame bar 287 raised to the position of Fig. 3. If any of the indicators have been set at the previous operation this will return them to the position such that zero appears. During the latter half of the operation the arm 280 is reversely moved throwing the rack bars 121 forward into the position of Fig. 2 and therefore during the return of the differential elements including the segments 84 the rack bars 121 will be moved downwardly the proper distance to set the indicators at the desired amount. The arms 278 extend slightly above the shaft 279 and are provided with loosely mounted latching pawls 290 adapted to engage rollers 291 on the indicator bars 121. This mechanism is for the purpose of retaining in normal position any of the indicators which have not been set at the previous operation. If this mechanism was not present, when the arms 278 are rocked rearwardly removing the rack bars 121 from mesh with pinions 120 the bars would immediately drop until struck by the ascending frame bar 287. The latches 290 serve to prevent this unnecessary movement.

It will be seen that the timing of the indicator throwing devices is such that the rack bars 121 remain in gear at the end of the operation so that overthrow of the indicating mechanism is positively and absolutely prevented. This is a very important object to be attained in machines of this type.

It will be seen that on Fig. 1 indicators are provided for one series of banks of keys only and this would be the case in practice when the machine was to be used as a cost and selling price machine as of course it would not be desired to exhibit the cost price of articles sold. If the machine is used as an ordinary two department register then an additional set of indicators would be provided. The two sets of printing wheels are arranged to print in two different colors such for example as red and black by the use of two inking ribbons of the said colors.

While the form of mechanism here shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows:

1. In an accounting machine, the combination with an operating mechanism, and a locking element movable therewith, of a lever normally locking said element, a series of keys, a detent therefor and moved thereby, a lever moved by said detent, a shaft driven by said lever, and means actuated by said shaft for releasing said locking lever and thereby unlocking said operating mechanism.

2. In an accounting machine, the combination with a reciprocatory main operating mechanism, of a plurality of banks of keys, a detent for each bank and moved by any key in the bank, pawls mounted independently of said detents for latching same in adjusted position, a special key having an extension, a bar passing all of the latch pawls and adapted to be reciprocated at will by said key extension to release all of said pawls, and means carried by said operating mechanism for reciprocating said bar to release said pawls at the completion of each operation of said mechanism.

3. In an accounting machine, the combination with an operating mechanism, of a bank of keys, printing devices controlled thereby, means for feeding a slip comprising a roller, a pivoted cam device controlled by the operating mechanism for moving said roller, and a gravity arm for holding the roller in feeding position for the purpose specified.

4. In an accounting machine, the combination with a series of keys, of a series of differentially driven elements, a series of driving elements for driving the differential elements, a series of gear pinions, geared segments forming connections between said gear pinions and the differential elements, a series of indicators, indicator rack bars normally meshing with the gear pinions, and means for swinging the rack bars out of operative engagement with the gear pinions before the differentially driven elements have commenced to operate said gear pinions and then swinging them back into engagement with the pinions after they have been adjusted, so that when said pinions are returned to normal position the rack bars will be moved to set the indicators.

5. In an accounting machine, the combination with a series of keys, of a driving element having a constant excursion of movement at each operation of the machine, a driven element driven by the driving element, a latch intermediate the driven and the driving elements normally ineffective, means intermediate the keys and the latch for causing said latch to become effective when a key is depressed, a projection on the latch adapted to be engaged by the depressed key to stop the driven element and unlatch the driving element therefrom, whereby said driving element may continue its excursion of movement, a second latch for latching the driven element to the depressed key during the said continued movement of the driving element, and a projection on the driving element whereby upon return of said driving element said projection will operate the second latch to unlatch the driven element from the key after which the driven element will be returned to normal position by the driving element.

6. In an accounting machine, the combination with a series of totalizer wheels, of transfer disks one for each wheel and carrying transfer pawls, plungers holding said disks against movement, trip cams carried by said wheels for withdrawing said plungers to release said transfer cams, springs for moving said cams when released, and helically positioned devices for restoring said transfer pawls to normal position.

7. In an accounting machine, the combination with differentially movable actuating elements, and totalizer wheels operated thereby, of trip cams carried by said wheels, transfer disks, transfer pawls carried by said disks and positioned to engage said wheels, plungers normally holding said transfer disks against movement but constructed to be released by said trip cams, and means for positively successively causing the transferring movement of said transfer pawls after they have been released.

8. In a cash register, the combination with a driving member having an invariable excursion at each operation of the machine, of a driven member with connections for giving a variable movement thereto by said driving member, manipulative devices, and a plurality of pawls carried by the driven member, one of which engages the manipulative devices to determine the extent of movement of the driven member and the other of which engages said manipulative devices to prevent rebound of the driven member.

9. In an accounting machine, the combination with a plurality of type carriers, of an operating mechanism therefor, feed rollers for a record slip normally out of operative position, means actuated by the operating mechanism for bringing the feed rollers into operative position and then rotating same to feed the slip, and an auxiliary means for holding the feed rollers in operative position while the slip is being fed.

10. In an accounting machine, the combination with a plurality of type carriers, of an operating mechanism therefor, feed rollers for a record slip normally out of operative position, resilient means actuated by the operating mechanism for bringing the feed rollers into operative position and then rotating same to feed the slip, and a gravity arm for holding the feed rollers in operative position while the slip is being fed.

11. In a cash register, the combination with a driving member having a constant excursion at each operation of the machine, of a differentially movable member driven thereby, an indicator, means connecting the driven member with the indicator, mechanism for disconnecting the connecting means from the driven member and restoring it to normal position, and a pivoted pawl for latching said connecting means while it is disconnected from the driven member.

12. In a cash register, the combination with a driving member having a constant excursion at each operation of the machine, of a differentially movable member driven thereby, an indicator, a rack bar connecting the driven member with the indicator, mechanism for disconnecting the rack bar from the driven member and restoring it to normal position, and a pivoted pawl for latching said rack bar in this position while disconnected from the driven member.

13. In a cash register, the combination with an operating mechanism, of a plurality of banks of keys, a detent for each bank and moved by any key in the bank, means for locking said detents in adjusted position, a bar passing all of said latching means and adapted to be reciprocated at will to release all of said latching means, a special key for operating said releasing bar and a locking device for preventing operation of said key when said operating mechanism is out of normal position and for locking said operating mechanism when said key is out of normal position.

In testimony whereof I affix my signature in the presence of two witnesses.

OSCAR F. DAVISSON,
Administrator (with will annexed) of the estate of Thomas Carney.

Witnesses:
J. B. HAYWARD,
R. A. CARNEY.